United States Patent [19]

Takamatsu et al.

[11] 4,380,043
[45] Apr. 12, 1983

[54] APPARATUS FOR ILLUMINATING INSTRUMENT POINTERS

[75] Inventors: Mashiro Takamatsu, Toyota; Makoto Nakao, Yokohama; Isao Ogawa, Sagamihara, all of Japan

[73] Assignees: Toyota Jidosha Kogyo Kabushiki Kaisha, Toyota; Jeco Co., Ltd., Kawasaki, both of Japan

[21] Appl. No.: 213,466

[22] Filed: Dec. 5, 1980

[51] Int. Cl.³ .................................... G01D 11/28
[52] U.S. Cl. ............................. 362/26; 362/31; 340/815.17
[58] Field of Search ............... 362/23, 26, 27, 31, 362/32; 340/366 B

[56] References Cited

U.S. PATENT DOCUMENTS

| | | | |
|---|---|---|---|
| 3,040,168 | 6/1962 | Stearns | 362/31 X |
| 3,129,691 | 4/1964 | Walker | 362/26 X |
| 3,490,226 | 1/1970 | Anderson et al. | 362/26 X |
| 3,761,703 | 9/1973 | Mund et al. | 362/26 X |
| 4,177,501 | 12/1979 | Karlin | 362/26 X |
| 4,218,726 | 8/1980 | Fukasawa et al. | 362/23 |
| 4,257,084 | 3/1981 | Reynolds | 362/26 X |
| 4,258,643 | 3/1981 | Ishikawa et al. | 362/26 X |
| 4,323,951 | 4/1982 | Pasco | 362/27 |

Primary Examiner—Peter A. Nelson
Attorney, Agent, or Firm—Charles E. Pfund

[57] ABSTRACT

An apparatus for illuminating instrument pointers comprises a dial board having a shaft hole, pointer shafts provided perpendicularly to a pointer shaft drive unit and projecting through the shaft hole to the front of the dial board, a light conductive member having a light receiving section and a light transmission section made of a transparent material and disposed behind the dial board, a plurality of instrument pointers each having a collar section and a pointer section made of a transparent material and mounted on the pointer shaft such that a light beam emitted from the light transmission section is introduced through the collar section, and a light emitting member provided oppositely to the light receiving section. A light beam from the light emitting member is propagated through the light conductive member to the collar section and then to the pointer section, so that each instrument pointer is illuminated.

6 Claims, 5 Drawing Figures

APPARATUS FOR ILLUMINATING INSTRUMENT POINTERS

BACKGROUND OF THE INVENTION

The present invention relates to an apparatus for illuminating instrument pointers, wherein light is emitted through the pointers so as to provide better visibility.

There has been proposed so called indirect illumination for illuminating instruments having pointers, in which pointers are illuminated by light which is reflected on the inner wall of the enclosure of the instrument.

In one example of prior art pointer illuminating apparatus employing indirect illumination system for use in automobile clocks, a transparent dial board with a printed film provided on its surface is disposed to partition the interior of the enclosure, the hour hand shaft, minute hand shaft and second hand shaft driven by the clock movement located behind the dial board are passed through an opening formed in the board, and the hour hand, minute hand and second hand are mounted to the shafts in parallel to the dial board. A lamp is provided behind the dial board, and a shadow plate is attached to the periphery of a transparent front plate of the enclosure. The printed film on the transparent dial board is made up of a white lower layer and a black upper layer which is partly removed in accordance with the dial indication. In such an arrangement, part of light emitted from the lamp illuminates the entire transparent dial board. Therefore, light passing through the white layer is radiated forwardly only through the dial indication removed of the black printed layer, and thus the indication is displayed in a mild light. On the other hand, light passing through a gap between the side edge of the dial board and the interior wall of the enclosure is reflected on the interior wall of enclosure and on the back surface of the shadow plate, and illuminates the dial board and the front surface of the pointers.

Such a conventional system as described above, however, does not provide satisfactory visibility since pointers are illuminated by reflected light, and the car driver will possibly fail to read out time correctly when he glances at the clock. Moreover, when the light intensity is increased to enhance the brightness of the pointers, brightness of the dial board is also increased, which adversely affects transparence illumination of the dial board.

SUMMARY OF THE INVENTION

The present invention is directed to solve the above-mentioned deficiencies, and therefore, it is an object of this invention to provide an apparatus for illuminating instrument pointers wherein the pointers are illuminated not by indirect fashion but by light emitted from the inside by use of a simple structure, so as to enhance visibility of the pointers.

Another object of the present invention is to provide an apparatus for illuminating instrument pointers which can also enhance the visibility of the dial board.

A further object of the present invention is to provide an apparatus for illuminating the second hand which can illuminate the second hand from the inside and minimize the length of the pointer shaft.

According to one aspect of the present invention, there is provided an apparatus for illuminating instrument pointers comprising:

a dial board having a shaft hole;

pointer shafts extending from a pointer shaft drive unit to pass through said shaft hole to the front of said dial board;

a light conductive member made of a transparent material and disposed behind said dial board, said member comprising a light receiving section and a light transmission section;

a plurality of instrument pointers each made of a transparent material and comprising a collar section and a pointer section, each of said instrument pointers being mounted on said pointer shaft such that light beam emitted from said light transmission section is introduced through said collar section; and a light emitting member opposing said light receiving section, for emitting light beam being transmitted through said light conductive member to said collar sections and to said pointer sections so as to illuminate said instrument pointers.

According to another aspect of the present invention, there is provided an apparatus for illuminating instrument pointers comprising:

a dial board having a shaft hole;

pointer shafts extending from a pointer shaft drive unit to pass through said shaft hole to the front of said dial board;

a light conductive member made of a transparent material and disposed behind said dial board, said member comprising a light receiving surface and a light transmission surface;

a light emitting member opposing said light receiving surface;

a plurality of instrument pointers each made of a transparent material and comprising a collar section and a pointer section, said instrument point being disposed in front of said dial board by mounting said collar section on said pointer shaft;

said collar section passing through said shaft hole so that its outer peripheral surface faces said light transmission surface and light beam from said light emitting member is introduced through said light conductive member to said collar section in the rear of said dial board and then to said pointer section.

BRIEF DESCRIPTION OF THE DRAWINGS

Other objects, features and advantages of the present invention will be apparent from the following detailed description in conjunction with the accompanying drawings in which.

DETAILED DESCRIPTION OF THE PREFERRED EMBODIMENTS

Figure 1:
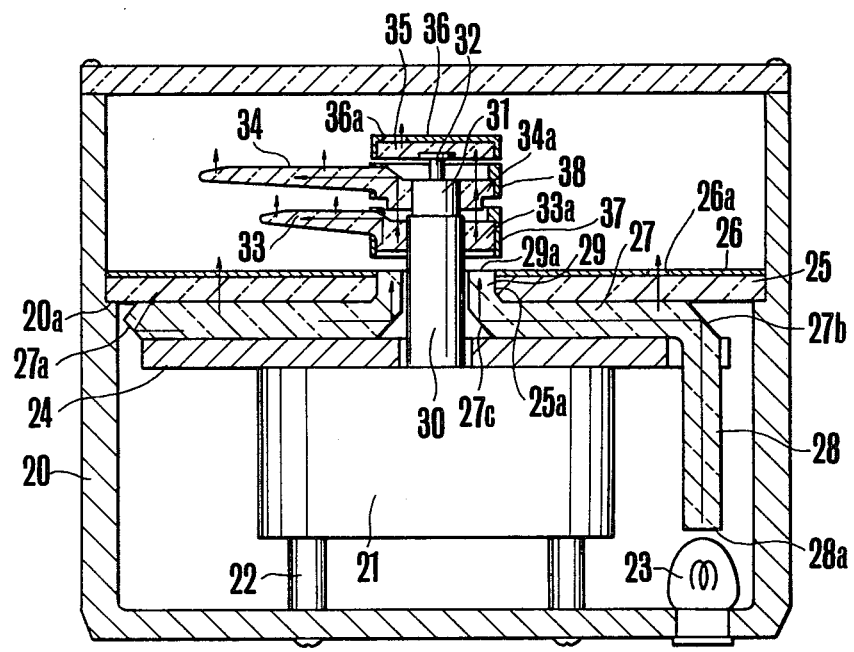
FIG. 1 is a sectional side view of the apparatus according to the present invention.

Referring now to FIG. 1, there is shown a preferred embodiment of the apparatus for illuminating instrument pointers in accordance with the present invention which is applied to a car clock. The apparatus is provided with an enclosure 20 having a shoulder portion 20a on its interior wall, a clock movement 21 including a pointer shaft drive unit and secured by pillars 22 to the bottom of the enclosure 20 for driving the pointer shafts, a lamp 23 disposed at one end of the bottom of the enclosure 20 for emitting light, and a mount plate 24 for mounting a dial board 25 on the movement 21 of the clock. The dial board 25 is made of a milky semi-transparent material and formed with an opening or a shaft hole 25a in the center thereof. On the front surface of the dial board 25, a non-transparent light-shield film 26 is formed by printing or the like, except for indicator portions 26a where numeric or symbolic patterns are formed. The peripheral edge of the dial board 25 is placed on the shoulder portion 20a of the enclosure 20, so that light from the light source located behind the dial board does not leak to the front. Interposed between the mount plate 24 and the dial board 25 is a light conductive plate member 27 made of a transparent material such as acrylic resin. At a portion of the peripheral edge of the light conductive member 27, there is provided a light receiving section 28 extending backward and perpendicularly to the light conductive member 27, and at the internal edge of the light conductive member 27, there is provided a cylindrical light transmission section 29 extending in the forward direction and inserted into the shaft hole 25a of the dial board 25. The end plane 28a of the light receiving section 28 faces the lamp 23, and the end plane 29a of the light transmission section 29 is terminated such that it is substantially flush with the front face of the dial board 25. The light conductive member 27 is further provided with a reflective plane 27a in its peripheral side surface, a reflective plane 27b at its periphery corresponding to the position of the light receiving section 28, and a reflective plane 27c on its internal side surface.

An hour hand shaft 30 projecting in the forward direction from the movement 21 of the clock loosely passes through a cylindrical hole in the light transmission section 29 of the light conductive member 27 and extends beyond the front of the dial board 25. Inside the hour hand shaft 30, a minute hand shaft 31 is provided, and inside the minute hand, a second hand shaft 32 is provided in the concentric fashion. An hour hand 33 formed of a transparent material and having a cylindrical collar is mounted on the hour hand shaft 30 by press-fitting the collar onto the shaft 30. In this case, the collar 33a is secured on the shaft so that its back plane faces the end plane 29a of the light transmission section 29. In the same fashion, a minute hand 34 formed of a transparent material and having a collar 34a is mounted on the minute hand shaft 31 by press-fitting the collar onto the shaft 31. In this case, the minute hand is secured on the shaft 31 so that the back plane of the collar 34a faces the front plane of the collar 33a of the hour hand shaft 33. Finally, a disk-type second hand 35 formed of a transparent material is mounted on the second hand shaft 32. On the front and side surfaces of the second hand 35, a light shield film 36 is formed by printing or the like, which is partly removed on the front surface so as to form the second-indication mark 36a. The collars 33a and 34a and the second hand 35 are made substantially in the same diameter, and cylindrical light shield caps 37 and 38 in the same color as that of the light shield film 36 are provided on the peripheral surfaces of the collars 33a and 34a, respectively.

The structure of the hour hand 33 will now be described in detail with reference to FIG. 2.

Figure 2:
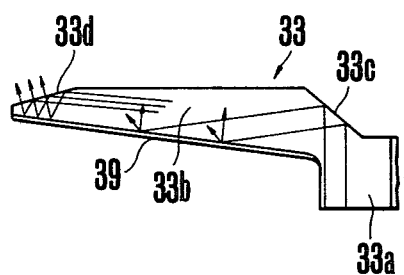
FIG. 2 is a partial sectional view of the hour hand.

FIG. 2 is a partial sectional view of the hour hand. The hour hand 33 is made up of the collar 33a and a pointer 33b extending in the lateral direction from the collar with its back surface slightly slanting forward, a reflective plane 33c is formed at the front base portion of the pointer 33b, and slant plane 33d is formed at the end of the pointer so that the fore end of the pointer is tapered. Moreover, a reflective film 39 made of color paint is formed on the back surface of the pointer 33b. A light beam entering through the back plane of the collar 33a reflects on the reflective plane 33c to enter into the pointer 33b, and is partly scattered by the reflective film 39 so as to be radiated forward. The remainder is transmitted to the fore end of the pointer and reflected by the slant plane 33d and then by the reflective plane 39 so as to be radiated forward. In general, a light beam propagated in the pointer 33b is attenuated, making the fore end of the pointer darker than the base portion. In the above structure, however, the light beam is concentrated at the slant plane 33d, so that the brightness at the fore end of the pointer can be compensated. Consequently, the pointer 33d emits light substantially in a uniform brightness covering the base and the fore end.

The minute hand 34 has exactly the same structure as that of the hour hand.

Figure 3:
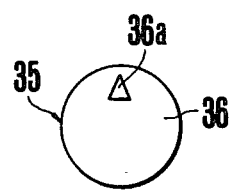
FIG. 3 is a front view of the second hand.

FIG. 3 is a front view of the second hand 35, showing an arrow-shaped second pointer mark 36a formed in the light shield film 36.

In the apparatus having the structure as described above, light beam emitted from the lamp 23 enters the light receiving section 28 through the end plane 28a, reflects on the reflective plane 27b to enter into the light conductive member 27, and reflects on the reflective plane 27a at its periphery so that it diffuses onto the entire surface of the light conductive member 27. Part of the light beam inside the light conductive member 27 enters the dial board 25 in front of it, and the remainder reflects on the reflective plane 27c and enters the light transmission section 29. A light beam entering the dial board 25 turns into a mild milky light, and it is radiated forward through the indicator portion or dial indication 26a. In this case, light beam from the lamp 23 does not leak forward through the peripheral edge of the dial board 25, and thus the illuminating effect of the transparence dial board is enhanced.

On the other hand, the light beam radiated forward through the light transmission section 29 enters the collar 33a of the hour hand 33, reflects on the reflective plane 33c, and is radiated uniformly from the entire surface of the pointer 33b to the front, as mentioned with reference to FIG. 2. Part of the light beam going out of the collar 33a through the front surface enters the collar 34a of the minute hand 34 through its back surface, and is radiated uniformly from the entire surface of the pointer to the front, and a remaining light beam goes out of the collar 34a through its front surface and enters the second hand 35. The light beam entering the second hand 35 is radiated forward through the second-indication mark 36a.

In this arrangement, the amount of light entering the collars 33a and 34a and the second hand 35 does not vary whatever angle of rotation these pointers take, and they can always be displayed in a constant brightness. Attenuation of light at the fore end of the hour hand 33 and minute hand 34 is compensated by means of the slant plane 33d and reflective film 39, as mentioned with reference to FIG. 2. Although the second hand 35 is located farthest from the lamp 23 and a small amount of light can reach, a sufficient brightness is obtained by light radiated through the small areas of the second-indication mark 36a on the front surface with remaining portion thereof being covered by the light shield film 36. Accordingly, a uniform brightness can be obtained for all pointers. For transmitting light, the collars 33a and 34a have relatively large diameter. However, the second hand 35 receiving light also functions to cover the front of the collar 34a of the minute hand 34, and it is useful not only to prevent leakage of light but also to decorate the clock. In addition, light beams leaking at the side end are not only shielded but reflected inward by the light shield caps 37 and 38, resulting in the enhancement of brightness. Since the light shield caps 37 and 38, and the light shield film 36 of the second hand have the same diameter to form a column as a whole, they establish a single column appearance which is excellent in design. The excellency can be promoted if the surface of the light shield caps 37 and 38 are finished and colored indentically with the light shield film 36.

The dial board 25 is illuminated by the light conductive member 27 which is disposed behind it to cover its entire area, so that the indicator portion 26a is illuminated uniformly, and well-balanced dial display can be obtained. Moreover, since no light leaks to the front and the light is transmitted only through the indicator portion 26a, the transparence illumination is achieved more effectively. The dial board 25, hour hand 33, minute hand 34, and second hand 35 are all illuminated in the same internal illumination system, and accordingly the design can be balanced as a whole.

In the first embodiment of the invention shown in FIG. 1, however, part of light beam radiated from the end plane 29a of the light transmission section 29 leaks to illuminate the front surface of the dial board 25 directly or by reflection on the light shield cap 37. This results in halation on the front surface of the dial board 25, causing poor visibility. Visibility of the dial is much deteriorated for the dial board 25 shown in FIG. 1, which employs transparence illumination wherein light is transmitted through the dial board 25 and radiated through the indicator portion 26a.

Figure 4:
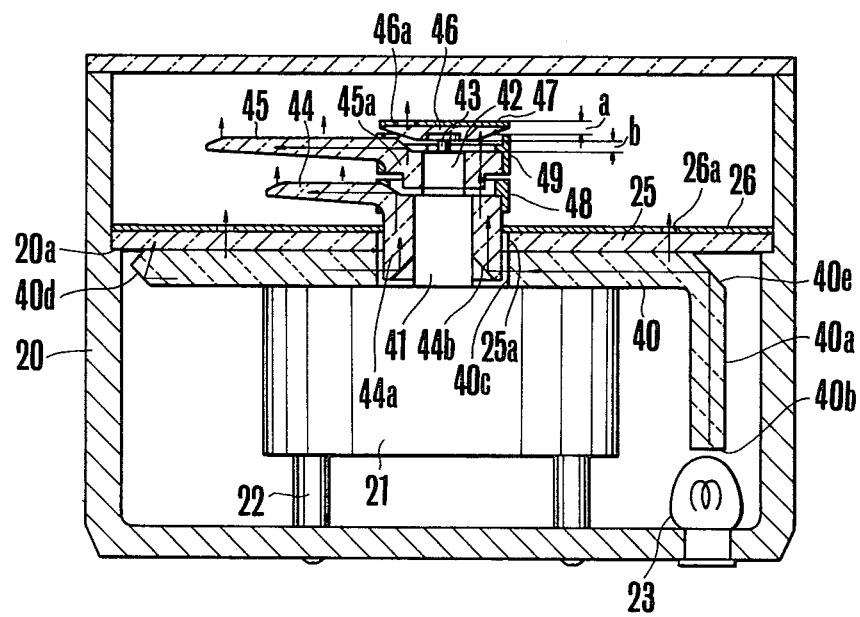
FIG. 4 is a sectional side view of another embodiment of the apparatus according to the present invention.

This problem is solved by the second embodiment of the invention shown in FIG. 4. in FIG. 4, the same reference numbers are used for identical portions, and explanation thereof will be omitted.

In this embodiment, a light conductive member 40 also functions as a mount plate for mounting the dial board 25 on the movement of the clock. The light conductive member 40 is made of a transparent material such as acrylic resin forming a plate, as in the case of the previous embodiment. At a portion of the peripheral edge of the light conductive member 40, there is provided a pillar-shaped light receiving path 40a extending backward and parpendicularly to the light conductive member 40, with its end plane serving as a light receiving plane 40b facing the lamp 23. At the center of the light conductive member 40, there is provided a shaft hole, whose internal surface forms a light transmission plane 40c. Reflective planes 40d and 40e are formed on one periphery of the light conductive member 40 and on the other periphery where the light receiving path 40a is provided, respectively.

An hour hand shaft 41 projecting forward from the movement 21 passes through a shaft hole 25a to the front of the dial board 25. A minute hand shaft 42 is provided inside the hour hand shaft 41, and a second hand shaft 43 is provided inside the minute hand shaft 42 in concentric fashion. An hour hand 44 formed of a transparent material and having a cylindrical collar is mounted on the hour hand shaft 41 by press-fitting the collar onto the shaft 41. The light transmission plane 40c and the shaft hole 25a are made slightly larger than the diameter of the collar 44a, so that the end portion of the collar 44a is loosely inserted into the light transmission plane 40c and shaft hole 25a. Thus, the peripheral surface at the end of the collar 44a faces the light transmission plane 40c. The internal surface at the end of the collar 44a is formed with a reflective plane 44b which reflects a light beam entering through the peripheral plane to the front. A minute hand 45 formed of a transparent material and having a collar 45a is mounted on the minute hand shaft 45 by press-fitting the collar 45a onto the shaft 42. In this case, the collar 45a is positioned such that its back surface faces the front surface of the collar 44a of the hour hand 44. A second hand 46 formed of a transparent material in the shape of inverted cone is mounted on the second hand shaft 43 in concentric fashion. The front surface of the second hand 46 is printed in white and further printed in black so as to form a light shield film 47. The light shield film 47 also covers the side surface of the second hand. The second hand in the shape of inverted cone will be described in detail later.

The collars 44a and 45a and the second hand 46 are made to have substantially the same diameter, and cylindrical light shield caps 48 and 49 in the same color as that of the light shield film 47 are put on the peripheral surfaces of the collars 44a and 45a, respectively. Reference number 46a denotes the second pointer mark.

The structure of the hour hand 44 will now be described in detail with reference to FIG. 5.

Figure 5:
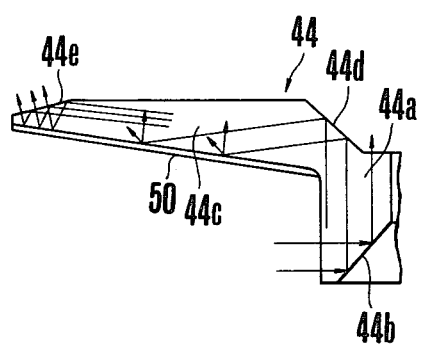
FIG. 5 is a partial sectional view of the modified hour hand.

FIG. 5 is a partial sectional view of the hour hand. The hour hand 44 is made up of the collar 44a and a pointer 44c extending in the lateral direction from the collar with its back surface slightly slanting forward, and a reflective plane 44d is formed at the front base portion of the pointer 44c, and furthermore, a slant plane 44e is formed at the end of the pointer. Moreover, a reflective film 50 made of color paint is formed on the back of the pointer 44c, as in the case of the previous embodiment. Light beam entering through the peripheral surface of the collar 44a reflects on the reflective plane 44b, and part of the light beam goes ahead so as to be radiated through the front surface, and the remainder reflects on the reflective plane 44d to enter the pointer 44c. The light beam entering the pointer 44c is radiated forward through the slant plane 44e via the same route as described in the previous embodiment. The minute hand 45 is constructed identically to the hour hand 44 having portions corresponding to the pointer 44c, reflective plane 44d, slant plane 44e, and reflective film 50, as in the case of the previous embodiment.

In the apparatus having the structure as described above, light beam emitted from the lamp 23 enters the light receiving plane 40b, goes through the light receiving path 40a, reflects on the reflective plane 40e, then enters the plate section of the light conductive member 40. Light beam entering the light conductive member 40 is partly reflected by the reflective plane 40d of the peripheral surface and radiated through the light transmission plane 40c at the central portion in the axial direction, and the remainder is diffused on the entire surface of the plate section of the light conductive member 40 so as to enter directly into the dial board 25 which is in contact with the front plane of the light conductive member 40. The light beam entering the dial board 25 turns into a mild milky light, and it is radiated forward through the indicator portion 26a to display the dial.

On the other hand, the light beam radiated forward through the light transmission plane of the light conductive member 40 enters the collar 44a of the hour hand 44 through the peripheral plane, and reflects on the reflective plane 44b to the front. This light beam partly enters the pointer to be radiated forward uniformly from the entire surface, as mentioned with reference to FIG. 5, and the remainder is radiated through the front surface of the collar 44a to enter the back of the collar 45a of the minute hand 45. The light beam entering the collar 45a is radiated uniformly through the entire surface of the pointer in the forward direction, as in the case of the hour hand 44, and at the same time it is also radiated forward through the front surface of the collar 45a to enter the back surface of the second hand 46. Since the light shield film 47 is formed on the front and side surfaces of the second hand, the light beam entering the second hand 46 is radiated forward from the second indicating mark 46a through the semi-transparent film of white paint.

It should be noted that the collar 44b is inserted into the shaft hole 25a of the dial board 25 and it receives a light beam from the light transmission plane 40c of the light conductive member 40 in the rear of the dial board 25, the leakage of light from the periphery of the collar 44a to the front of the dial board 24 can mostly be shut out so as to prevent halation.

Furthermore, the light conductive member 40 also functions as a mount plate, eliminating the previously-used mount plate, and the height of the clock can be made small and the pointer shafts can be made short.

As mentioned above, in the embodiment of FIG. 4, the second hand 46 is formed in an inverted cone having a slant plane on its rear side. Thus, when the front surface is printed by black paint, for example, for forming the light shield film 47, the thin side surface is also covered by the paint, resulting in formation of the light shield film 47 on the side surface only by a printing process for the front surface. Thus, the number of manufacturing processes can be reduced. In addition, since the second hand 46 is formed in the shape of inverted cone, its tapered central portion can be positioned deeper into the light shield cap 49 than its front edge and the virtual thickness a of the second hand 46 can be made smaller than the case of the previous embodiment. Consequently, the pointer shafts can be made shorter by the amount of reduction of the virtual thickness in the second hand, and the clock can be made smaller. Moreover, the gap b between the back surface of the second hand 46 and the front surface of the minute hand collar 45a can be made small, so that the loss of light entering the second hand 46 can be reduced. In addition, the gap between the side surface of the light shield film 47 and the light shield cap 49 can be made small, so that leakage of light is reduced.

It should be noted that white paint applied on the front surface is not necessary when the second hand is made from a milky semi-transparent material. It is also possible to arrange a dial board which also functions as a light conductive member.

According to the apparatus for illuminating the second hand, as shown in FIG. 4, visibility of the pointer is improved since it is illuminated from the inside, the pointer shafts can be made short, and the design of the clock can be improved.

In the above embodiments, a semi-transparent material is used for the dial board, however, it may be formed using a transparent material with its front surface painted in white and formed with a light shield film on it. It is also possible to construct the dial board which also functions as a light conductive member. A disk-type second hand is shown in the above embodiments, however, a pointer-type second hand similar to the minute hand may also be employed, with a light shield film formed on the front of the second hand collar. It is possible to apply this invention to a so called two-pointer clock which does not have the second hand. In this case, a light shield film is formed on the front surface of the minute hand collar. The invention can also be applied to various clocks other than car clocks.

The invention can of course be applied to various instruments other than clocks.

It can be seen from the above description that by use of the pointer illuminating apparatus in accordance with the present invention, instrument pointers are illuminated by internal light emission by means of a simple structure, and the instrument can be made compact and visibility of pointers can be greatly improved.

What is claimed is:

1. An apparatus for illuminating instrument pointers comprising:
    a dial board having a shaft hole;
    pointer shafts extending from a pointer shaft drive unit to pass through said shaft hole to the front of said dial board;
    a light conductive member made of a transparent material and disposed behind said dial board, said member comprising a light receiving section and a light transmission section;
    a plurality of instrument pointers each made of a transparent material and comprising a collar section and a pointer section, each of said instrument pointers being mounted on said pointer shaft such that light beam emitted from said light transmission section is introduced through said collar section; and
    a light emitting member opposing said light receiving section, for emitting light beam being transmitted through said light conductive member to said collar sections and to said pointer sections so as to illuminate said instrument pointers;
    wherein said instrument pointers include an hour hand and a minute hand, the back surface of the collar section of said hour hand facing said light transmission section, and the back surface of the collar section of said minute hand facing the front surface of the collar section of said hour hand; and
    wherein the front end surface of the collar section of said hour hand is formed with a slant plane, said light beam being transmitted through said slant plane to said collar of the minute hand.

2. An apparatus for illuminating instrument pointers comprising:
    a dial board having a shaft hole;
    pointer shafts extending from a pointer shaft drive unit to pass through said shaft hole to the front of said dial board;
    a light conductive member made of a transparent material and disposed behind said dial board, said member comprising a light receiving section and a light transmission section;

a plurality of instrument pointers each made of a transparent material and comprising a collar section and a pointer section, each of said instrument pointers being mounted on said pointer shaft such that light beam emitted from said light transmission section is introduced through said collar section; and a light emitting member opposing said light receiving section, for emitting light beam being transmitted through said light conductive member to said collar sections and to said pointer sections so as to illuminate said instrument pointers;

wherein said instrument pointers include an hour hand and a minute hand, the back surface of the collar section of said hour hand facing said light transmission section, and the back surface of the collar section of said minute hand facing the front surface of the collar section of said hour hand; and wherein said apparatus further comprises a second hand illuminating device which receives on its back surface a light beam propagated through the collars of said hour hand and minute hand so that the second hand is illuminated, the collar of said minute hand being provided with a cylindrical light shield cap, said second hand being formed in the shape of disk having a diameter substantially equal to the diameter of said cap.

3. An apparatus for illuminating instrument pointers in accordance with claim 2, wherein said second hand being formed in the shape of inverted cone such that the back surface of said second hand is tapered.

4. An apparatus for illuminating instrument pointers in accordance with claim 2 or 3, wherein said second hand is made of a transparent material, with its front surface formed with a light shield film which is partly removed in the shape of second pointer mark.

5. An apparatus for illuminating instrument pointers in accordance with claim 4, wherein a semi-transparent film is provided under said light shield film.

6. An apparatus for illuminating instrument pointers in accordance with claim 2 or 3, wherein said second hand is made of a semi-transparent material, with its front surface formed with a light shield film which is partly removed in the shape of second pointer mark.

* * * * *